RADIO RECEIVER

Filed Feb. 6, 1956 3 Sheets-Sheet 1

INVENTOR.
Samuel M. Goldfus
BY Mueller & Aichele
Attys.

July 22, 1958 S. M. GOLDFUS 2,844,715

RADIO RECEIVER

Filed Feb. 6, 1956 3 Sheets-Sheet 2

INVENTOR.
Samuel M. Goldfus
BY Mueller & Aichele
Att'ys.

July 22, 1958 S. M. GOLDFUS 2,844,715

RADIO RECEIVER

Filed Feb. 6, 1956 3 Sheets-Sheet 3

INVENTOR.
Samuel M. Goldfus
BY Mueller & Aichele
Attys.

2,844,715
Patented July 22, 1958

2,844,715

RADIO RECEIVER

Samuel M. Goldfus, Chicago, Ill., assignor to Motorola, Inc., Chicago, Ill., a corporation of Illinois Application February 6, 1956, Serial No. 563,469

5 Claims. (Cl. 250—20)

The invention relates to superheterodyne radio receivers, and more particularly to the incorporation in such receivers of an improved fine tuning or band spread system.

Adequate coverage of the present day broadcasting band by a radio receiver can usually be obtained with a single condenser-coil combination in the radio frequency amplifier and a similar combination in the heterodyne oscillator of the receiver, and a vernier or band spread system is not really essential in such a receiver. However, when a radio is designed for the reception of the short-wave bands, a single condenser-coil combination in each of these stages is usually not adequate and tuning problems arise. Most short-wave radio receivers use a multiplicity of inductance coils each corresponding to a particular short-wave band, and these coils are selectively switched into the circuit of the receivers. It is also usual for reasons of economy, to tune all the coils individually with but a single condenser gang. This causes the relation between frequency coverage and condenser rotation to increase materially for the higher frequency short-wave bands. There is also a relatively greater crowding of the radio signals in the short-wave bands, and these two factors contribute to make fine tuning, or band spreading, almost essential in short-wave receivers.

Because of the crowded spectrum in the short-wave bands, it is most desirable for short-wave radio receivers to have relatively high selectivity. This high selectivity is usually built into the intermediate frequency amplifier and enables individual signals to be selected and used without undue interference. However, the high selective characteristics of the intermediate frequency amplifier in a short-wave receiver makes the tuning system of such a receiver somewhat difficult to design on an economical basis, because it is necessary for the radio frequency amplifier and heterodyne oscillator to be tuned precisely to produce the intermediate signal at exactly the correct frequency for optimum transfer through the intermediate frequency amplifier and amplification therein.

It is, accordingly, an object of the present invention to incorporate in a superheterodyne radio receiver a fine tuning system which enables the receiver to be conveniently tuned to individual signals in the relatively crowded short-wave bands, and which fine tuning system also enables the receiver to translate such signals to which it is tuned with optimum amplification through the intermediate frequency amplifier thereof.

Another object of the invention is to provide such an improved receiver that may be tuned quickly to a selected short-wave band, and which then may be tuned to individual signals in that band in an improved and simplified manner.

A feature of the invention is the provision in a superheterodyne radio receiver of an improved and simplified fine tuning system, which system provides an independent adjustment for the frequency of the heterodyne oscillator to enable that oscillator to heterodyne a series of adjacent signals translated by the radio frequency amplifier to precisely the selected intermediate frequency of the receiver, thereby enabling a series of closely adjacent signals to be individually selected by the intermediate frequency amplifier and translated by such amplifier for utilization by the receiver.

Further objects, features and attending advantages of the invention will be apparent upon consideration of the following specification and drawings in which.

The fine tuning system of the present invention finds utility when it is incorporated into a superheterodyne radio receiver. The invention comprises radio frequency signal selecting network having a relatively wide pass band and which simultaneously selects a plurality of adjacent radio frequency signals lying, for example, within a particular short-wave band. A first tuning means tunes the radio frequency signal selecting network through the particular band. A converter for the receiver includes a local oscillator which develops a heterodyne signal, and which incorporates an inductance coil with a second tuning means for varying the frequency of the oscillations thereof. The second tuning means is mechanically coupled to the first tuning means for the simultaneous control of the two tuning means. The converter heterodynes the signal from the local oscillator with the radio frequency signals tuned by the radio frequency signal selecting network to provide a group of adjacent intermediate frequency signals. An intermediate frequency signal selecting network is provided that has a relatively narrow pass band which is fixedly tuned to select a single intermediate frequency signal from the group. A tuning slug is movable in the field of the local oscillator inductance coil to provide an independent variation of the frequency of the heterodyne signal to determine the intermediate frequency signal to be selected by the intermediate frequency signal selecting network. Finally, a manually operated drive means for the first and second tuning means is provided, together with a manually operated control means for the tuning slug.

Figure 5:
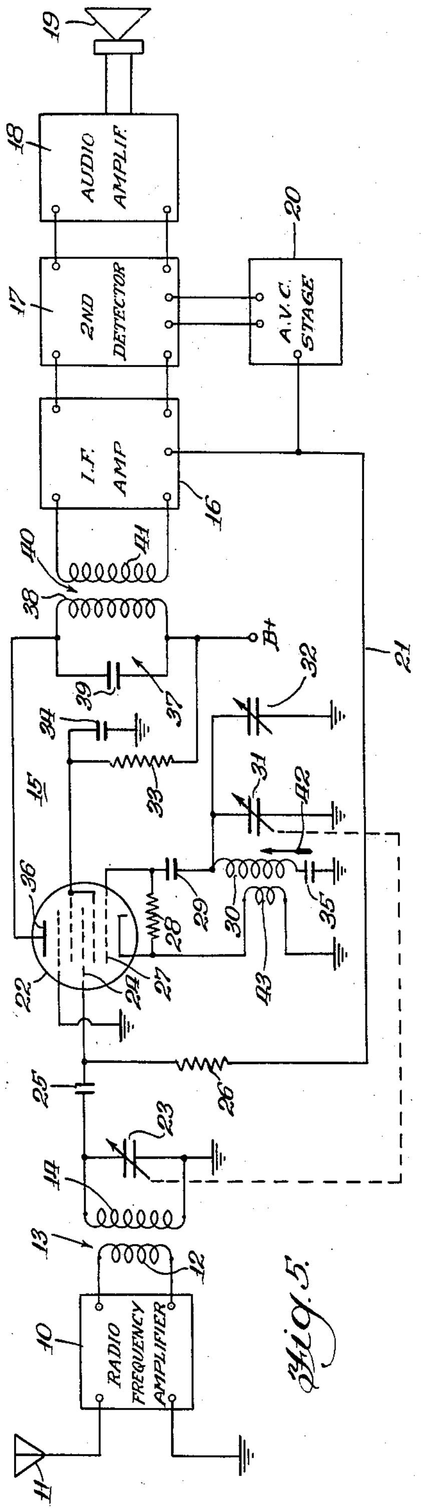
Fig. 5 is a circuit diagram of the radio receiver.

Turning first to Fig. 5, the radio receiver shown therein includes a radio frequency amplifier 10 having input terminals connected to the primary winding 12 of a coupling transformer 13. The secondary winding 14 of the transformer 13 is coupled to an oscillator-mixer or converter 15, which unit will be described in detail herein. The output terminals of the oscillator-mixer 15 are coupled to an intermediate frequency amplifier 16 of any desired number of stages. Amplifier 16 is coupled through a second detector 17 to an audio amplifier 18, the audio amplifier being connected to a suitable sound reproducing device 19. Second detector 17 is also coupled to an automatic volume control (AVC) stage 20 which has an input terminal connected by means of a lead 21 to the intermediate frequency amplifier 15 and to the converter or oscillator-mixer 15. The converter 15 includes an electron discharge device 22 which is connected in known fashion as an electron-coupled heterodyne oscillator and mixer. Winding 14 is shunted by a variable capacitor 23 to constitute a resonant, radio frequency, signal selecting network; one side of this network being coupled to a control electrode 24 of device 22 through a capacitor 25, and the other side thereof being connected to a point of reference potential or ground. Control electrode 24 is connected to the ABC lead 21 through a resistor 26.

Another control electrode 27 of device 22 is connected to the cathode thereof through a resistor 28. The control electrode 27 is connected in a circuit including capacitor 29, inductance coil 30 and capacitor 35 all series connected to ground. Coil 30 and capacitor are shunted by a variable capacitor 31 and by a trimmer capacitor 32 to form a resonant frequency-determining network for the oscillator section of the converter 15. The cathode of device 22 is connected to the coupling coil 43 which is inductively coupled to coil 30 to complete the oscillator circuit. Device 22 has a screen electrode connected through dropping resistor 33 to the positive terminal B+ of a source of unidirectional potential, and this electrode is bypassed to ground for radio frequency signals through capacitor 34. Device 22 also includes a suppressor electrode which is connected to ground, and it includes an anode 36 connected to the positive terminal B+ through the primary winding 38 of a coupling transformer 40. The primary winding is shunted by a capacitor 39 to form an intermediate-frequency, resonant, signal selecting circuit indicated as 37, the resonant circuit being highly selective and being tuned to the selected intermediate frequency of the receiver. The secondary winding 41 of transformer 40 is coupled to the intermediate frequency amplifier 16.

The receiver thus far described is capable of utilizing a plurality of wave signals extending through a predetermined frequency band. These signals are selected by the resonant circuit 14, 23 which is tuned through the band by the variable tuning capacitor 23. The selected signals are mixed and heterodyned in device 22 with the heterodyne signal generated by the oscillator section of this device, the frequency of the heterodyne signal being controlled by the variable capacitor 31 which is mechanically coupled to capacitor 23 for simultaneous tuning of circuits 14, 23 and 30, 31. The resulting intermediate frequency signal is selected by the resonant signal selecting circuit 37, and the selected signal is impressed on intermediate frequency amplifier 16 for translation thereby. The amplified intermediate frequency signal from amplifier 16 is detected in second detector 17; the resulting audio signal is amplified in audio amplifier 18; and the sound intelligence represented by this audio signal is reproduced by reproducing device 19. The automatic volume control stage 20 responds to the signal intensities at second detector 17 in known manner to place an AVC control voltage on lead 21 which is used to control the gain of the receiver.

Figure 1:
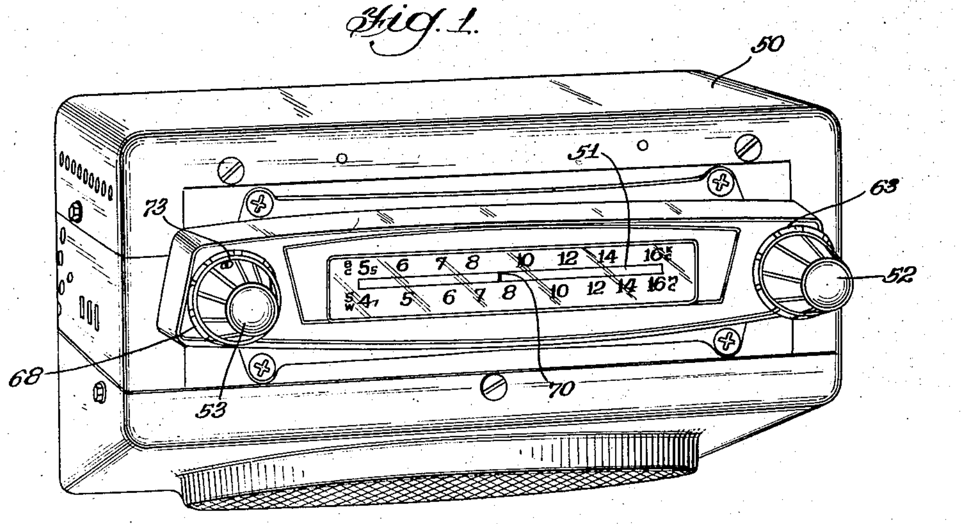
Fig. 1 is a front or panel view of a short-wave car radio receiver constructed to incorporate the present invention.
Figure 3:
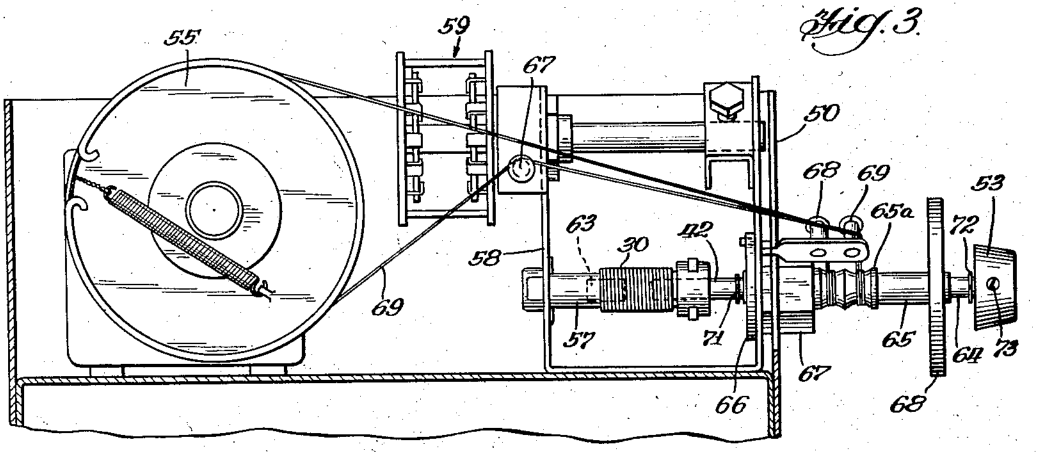
Fig. 3 is a sectional view of the radio taken along the line 3—3 of Fig. 2.
Figure 4:
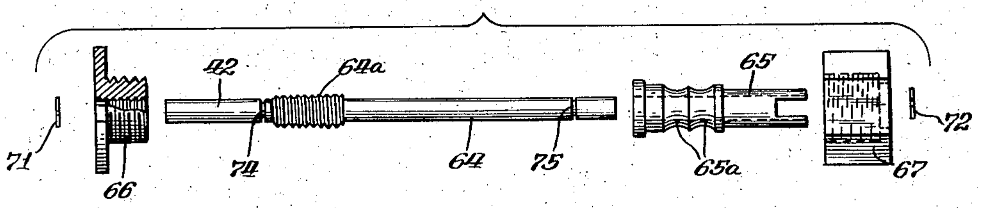
Fig. 4 is an exploded view of certain control components of the system of the present invention.

When the receiver of Fig. 1 is designed to operate in the short wave bands, it is desirable (as previously noted) that the intermediate frequency amplifier 16 have a relatively high selectivity so as to prevent undue mutual interference from the crowded signals encountered in these bands. This means that in the usual prior art receiver, great pains had to be taken to assure that capacitor 31 and capacitor 23 mechanically coupled thereto had the proper tracking relation. In accordance with the present invention, an independent fine tuning system is provided, which may take the form of a tuning core or slug 42 movable in the local oscillator inductance coil 30. This provides a frequency control for the local oscillator which is independent of the mechanically coupled or ganged variable capacitor tuning means 23, 31; and this enables the heterodyne oscillator to be tuned precisely to the proper frequency to enable a selected one of the signals impressed on device 22 by radio frequency amplifier 10 for any setting of tuning means 23, 31 to be heterodyned precisely to the correct intermediate frequency of the receiver. Moreover, core 42 may be adjusted, so that the group of adjacent signals impressed by the radio frequency amplifier on mixer-oscillator device 22 for any particular setting of the tuning means 23, 31 and heterodyned by that device, may be individually selected by circuit 37 for convenient fine tuning of the receiver through the band composed by such signals.

Figure 6:
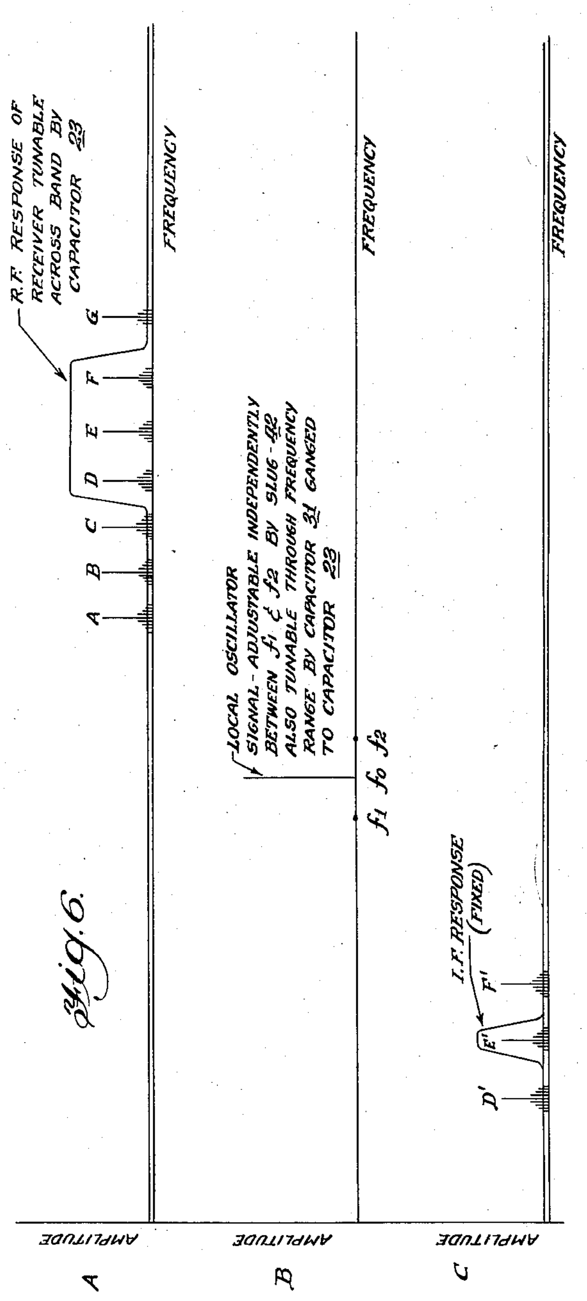
Fig. 6 is a group of curves useful in explaining the operation of the invention.

For example, and with reference to Fig. 6*a*, the signals A–G represent, for example, a group of adjacent radio-frequency signals lying within a certain short-wave band. The receiver is tuned to this band by the simultaneous tuning of capacitors 23 and 31. The selectivity of the radio frequency amplifier (including resonant network 14, 23) is sufficiently broad so that three signals, for example, signals D, E and F are selected and impressed on the mixer 22. Assuming that the local oscillator is tuned to a frequency $f_0$ (6B), the mixer produces three intermediate frequency signals (6C) D′, E′ and F′. Due to the relatively narrow pass band of the intermediate frequency selecting circuit 37, only one of these latter signals, namely, E′ is selected and translated by the receiver for reproduction in speaker 19. Independent adjustment of the tuning slug 42, however, enables the local oscillator frequency to be precisely adjusted so that the signal E′ will lie directly under the response curve of the intermediate frequency selecting circuit 37, for optimum translation thereof by the receiver. Moreover, further independent adjustment of tuning slug 42 to shift the local oscillator to frequency $f_1$ (6B) causes the signal D′ (6C) to be selected by circuit 37, and alternately, adjustment by core or slug 42 of the local oscillator to frequency $f_2$ causes the signal F′ (6C) to be selected. Therefore, variation of the tuning core 42 forms a convenient vernier or fine tuning control for tuning the receiver through any of the short-wave bands selected by the main tuning means 23, 31.

The mechanical details of a radio receiver incorporating the invention are shown in Figs. 1–4. The receiver, for example, may be designed to be mounted in an automobile and includes a usual outer housing 50. The housing includes a calibrated tuning dial indicator 51 on the front panel thereof, and it also has a usual pair of control knobs 52 and 53 supported on their control shafts at each end of the dial indicator. Control knob 52 may be a volume control, for example; and control knob 53 may control the main tuning of the receiver in a manner to be described.

Figure 2:
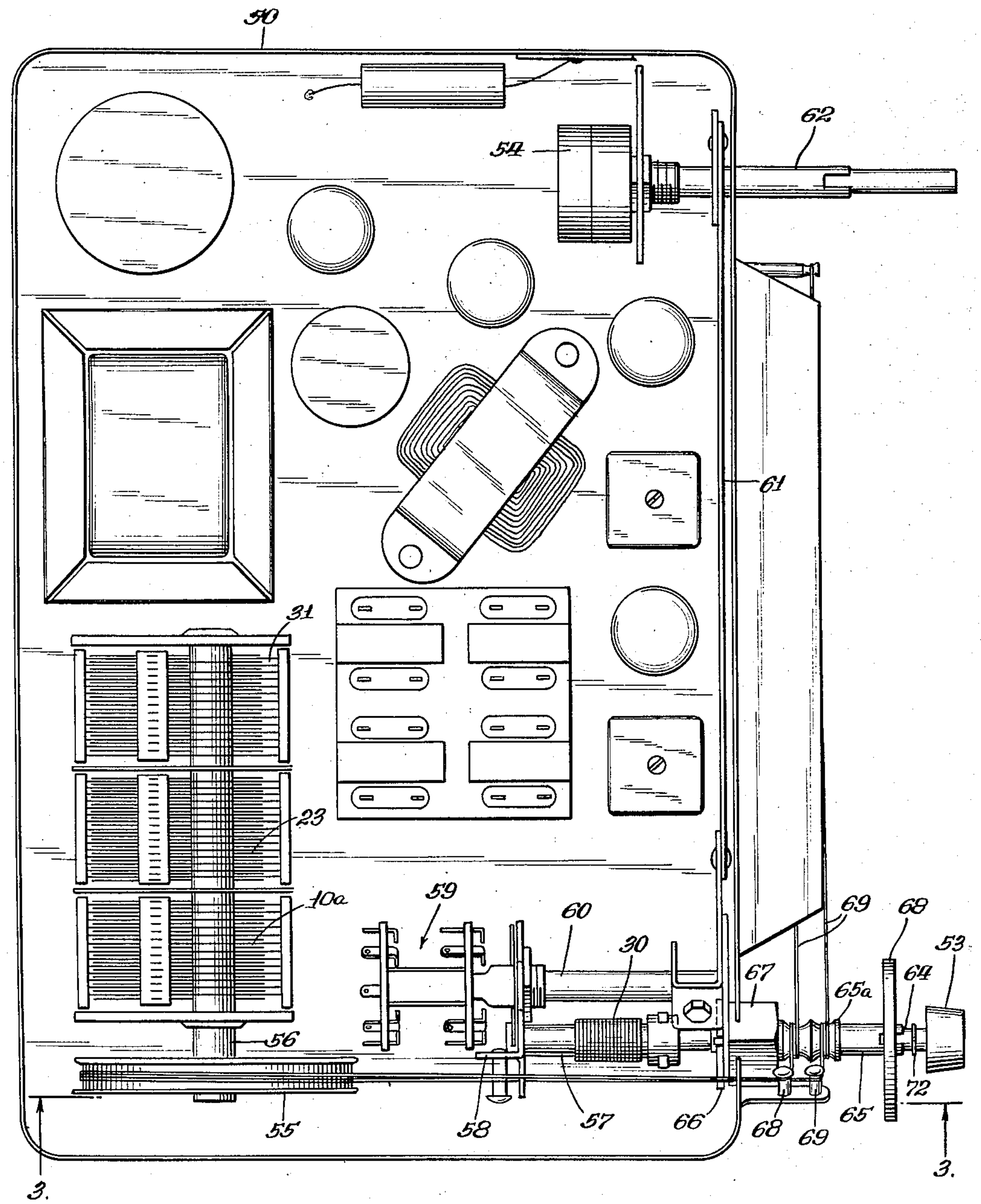
Fig. 2 is a plan view of the radio of Fig. 1, with the cover 10 removed.

The volume control actuated by knob 52 is shown in Fig. 2 as element 54, and the various other electrical and electronic components of the radio are shown in this figure. Moreover, the ganged condensers 23 and 31 are shown mounted on a common shaft 56 to be mechanically coupled one to the other as previously described. Moreover, the radio frequency amplifier 10 may include an additional tuning condenser 10*a* in its input circuit which is also mounted on the common shaft to form a usual ganged condenser unit. A drive pulley wheel 55 is affixed to one end of the shaft 56.

The local oscillator inductance coil 30 is mounted on a tubular coil form 57, which in turn is supported on a bracket 58 adjacent one side of the casing or housing 50 of the receiver. Also mounted on bracket 58 is a rotatable turret switch 59 which is adapted to switch various tuning coils into the receiver circuit for broadcast operation or for short-wave operation through the various short-wave bands. Switch 59 is actuated by a drive shaft 60 which is mechanically coupled through a linkage 61 to a control shaft 62 coaxial with the control shaft of volume control 54 and which may be actuated by a tuning knob 63 (Fig. 1) which surrounds the control knob 52.

A metallic rod 64 is threaded into the front panel of housing 50, and this rod has an end portion which forms the tuning core or slug 42 referred to previously herein. This end portion may be formed of brass or aluminum or iron or other metals. However, if iron is used it should be a powdered iron mixture to reduce radio frequency energy losses. If the material is non-ferric the inductance of the coil 30 is changed by the reflected reactance due to the "shorted turn" effect of the rod. If the end portion is of powdered iron the change of inductance is caused by the change of permeability. The rod 64 is mounted so that the end section 42 will extend into the tubular coil form 57 of the coil 30 in the inductive field of that coil. A powdered iron core 63 may be provided in the tubular form 57 at the other end of the coil 30, and so that rotation of the control rod 64 will vary the axial position of the portion 42 in the coil to control the effective inductance thereof and the resulting frequency of the heterodyne signal generated by the local oscillator.

A hollow drive shaft 65 for the common shaft 56 of the capacitor gang is rotatably mounted in housing 50 coaxial with the control rod 64. Shaft 65 is held on the housing by a grommet 66 extending through the front panel and having a threaded inner surface which engages the threads 64*a* of the control rod 64. The grommet 66 is held on the panel by a nut 67 which engages the threaded outer surface of the grommet from the front side of the panel. Shaft 65 is rotated by a control knob 68 which is in frictional engagement therewith, and the control rod 64 is rotated by the knob 53 referred to previously. A cord 69 is looped around the pulley wheel 55 over idler guide pulleys 67, 68 and 69, and around the portion 65*a* of drive shaft 65. The cord 69 also extends behind the indicator dial 51 to a pointer 70 to control the position of the pointer 70 along the calibrated dial of that indicator. As shown particularly in Fig. 3, both sections of cord 69 are looped around the portion 65*a* of drive shaft 65 for a positive drive of the pulley wheel 56 for both directions of rotation of the drive shaft.

A pair of C-brackets 71 and 72 is provided at the opposite ends of control rod 64 to limit the axial movement of core 42 in the field of coil 30. This movement is limited, for example, to two revolutions of the control rod 64. The C-washers 71 and 72 rest in grooves 74 and 75 respectively at ends of the control rod. These C washers serve as stops for the control rod travel in each direction by coming in contact with the face of grommet or bushing 66 and drive shaft 65. By adjusting the powdered iron core in the oscillator coil and the trimmer capacitor across the oscillator tuning capacitor, the calibration on dial 51 can be made to correspond accurately to the particular frequency of the signals accepted by the receiver. Moreover, the set-screw 73 that secures knob 53 to the control rod may be allowed to project slightly so that the operator can know the position thereof and turn the knob 53 for example to the right to the limit of motion and then return it one turn until the set-screw extends upwardly. This establishes the tuning slug (or core) 42 midway along its travel and in a selected axial position in coil 30. The receiver can be designed so that for this position of the tuning slug, the calibrations on dial 51 accurately correspond to the particular frequency of the signals accepted by the receiver.

To tune the receiver, the tuning slug 42 is first set at its selected position in the manner described above; the receiver is then tuned to a desired band by knob 68, this band being indicated accurately by pointer 70 on dial 51; and the receiver may then be tuned through the selected band by actuation of the knob 53.

The invention provides, therefore, an improved and simplified radio receiver which may be quickly tuned to a selected signal band, and then to individual signals in that band in a new and improved manner.

I claim:

1. In a superheterodyne radio receiver for utilizing a plurality of signals extending through a frequency band, the combination of a radio frequency signal-selecting network having a relatively wide pass band for the simultaneous selection of a plurality of such signals, first variable capacitor means for tuning said network through the frequency band, converter means including local oscillator for developing a heterodyne signal and including an inductance coil and further including second variable capacitor means mechanically coupled to said first variable capacitor means for varying the frequency of said heterodyne signal, said converter means including a portion for heterodyning the heterodyne signal with the signals selected by said radio frequency selecting network to obtain a corresponding plurality of intermediate frequency signals, an intermediate frequency selecting network having a relatively narrow pass band for selecting a single one of the intermediate frequency signals, a tuning slug movable coaxially in said inductance coil of said local oscillator to provide independent variation of the frequency of the heterodyne signal to change the one of said intermediate frequency signals selected by said intermediate frequency selecting network, a drive shaft for said first and second variable capacitor means, a cord and pulley drive coupling said drive shaft to said first and second variable capacitor means, and a longitudinally movable control shaft mounted within said drive shaft coaxially therewith axially aligned with and connected to said tuning slug.

2. In a superheterodyne radio receiver for utilizing a plurality of signals extending through a frequency band, the combination of a radio frequency signal selecting network having a relatively wide pass band for the simultaneous selection of a plurality of such signals, first variable capacitor tuning means for tuning said network through the frequency band, frequency converter means including a local oscillator for developing a heterodyne signal and including an inductance coil and further including second variable capacitor tuning means mechanically coupled to said first variable capacitor tuning means for varying the frequency of said heterodyne signal, said converter means including a portion for heterodyning the heterodyne signal with the signals selected by said radio frequency selecting network to obtain a corresponding plurality of intermediate frequency signals, an intermediate frequency selecting network having a relatively narrow pass band for selecting a single one of the intermediate frequency signals, a chassis for supporting the abovementioned elements, a metallic rod threaded into said chassis coaxial with said local oscillator inductance coil and extending into such coil for axial movement therein to provide independent variation of the frequency of the heterodyne signal and control the selection of individual ones of said plurality of intermediate frequency signals by said intermediate frequency signal selecting network, a drive shaft for said first and second variable capacitor tuning means rotatably mounted in said chassis in coaxial relation with said rod, and a cord drive extending from said shaft to said capacitor tuning means to provide a mechanical coupling therebetween.

3. In the radio receiver of claim 2, a pair of C-brackets affixed to said rod to limit the axial movement thereof in said local oscillator inductance coil, calibrated dial indicator also controlled by said cord drive, and means for indicating when said rod is in a predetermined axial position providing a desired relation between the calibrations of said dial indicator and the tuning position of said variable capacitor tuning means.

4. In a superheterodyne radio receiver for utilizing a plurality of signals extending through a frequency band, the combination of radio frequency signal-selecting network having a relatively wide pass band for the simultaneous selection of the plurality of such signals, first tuning means for tuning said network through the frequency band, converter means including local oscillator for developing a heterodyne signal and including an inductance coil and further including second tuning means mechanically coupled to said first tuning means for varying the frequency of said heterodyne signal, said converter means including a portion for heterodyning the heterodyne signal with the signals selected by said radio frequency selecting network to obtain a corresponding plurality of intermediate frequence signals, an intermediate frequency selecting network having a relatively narrow pass band for selecting a single one of the intermediate frequency signals, a tuning slug movable coaxially in said inductance coil of said local oscillator to provide independent variation of the frequency of the heterodyne signal to change the one of said intermediate frequency signals selected by said intermediate frequency selecting network, a drive shaft for said first and second tuning means, cord and pulley drive coupling said drive shaft to said first and second tuning means, and a longitudinally movable control shaft mounted within said drive shaft coaxially therewith axially aligned with and connected to said tuning slug.

5. In a superheterodyne radio receiver for utilizing a plurality of signals extending through a frequency band, the combination of a radio frequency signal selecting network having a relatively wide pass band adapted to pass simultaneously a plurality of such signals, first tuning means for tuning said network through the frequency band, converter means including a local oscillator for developing a heterodyne signal and including an inductance coil and also including second tuning means for varying the frequency of the heterodyne signal, said second tuning means being mechanically coupled to said first tuning means, said converter means including a portion for heterodyning the heterodyne signal with a signal selected by said radio frequency signal selecting network having a relatively narrow pass band and fixedly tuned to select a single intermediate frequency signal from the mixer stage, a tuning slug movable in the field of said inductance coil of said local oscillator to provide variation of the frequency of a heterodyne signal independently of the adjustment of said first and second tuning means to change the signal applied to said intermediate frequency selecting network, manually operated drive means for said first and second tuning means, indicator means for said first and second tuning means, a drive shaft for said first and second tuning means, and a longitudinally movable control shaft connected to said tuning slug for manual control thereof.

References Cited in the file of this patent

UNITED STATES PATENTS 2,587,667 Toth ------------------- Mar. 4, 1952

OTHER REFERENCES

Moxon: "Making the Most of Short Waves," Wireless World, June 1941, pp. 148 to 151, of which only page 150 is cited. TK5700–W45.